(12) United States Patent
Suenaga et al.

(10) Patent No.: US 7,005,208 B2
(45) Date of Patent: Feb. 28, 2006

(54) METHOD FOR MOUNTING SEALS FOR FUEL CELL AND FUEL CELL

(75) Inventors: Toshihiko Suenaga, Wako (JP); Masajiro Inoue, Wako (JP); Nobuaki Kimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 647 days.

(21) Appl. No.: 09/981,254

(22) Filed: Oct. 18, 2001

(65) Prior Publication Data

US 2002/0051902 A1 May 2, 2002

(30) Foreign Application Priority Data

Oct. 18, 2000 (JP) .............................. 2000-318366

(51) Int. Cl.
*H01M 2/02* (2006.01)
*H01M 2/08* (2006.01)

(52) U.S. Cl. .............................. 429/36; 429/34; 429/35

(58) Field of Classification Search .................. 429/33, 429/35, 44, 46, 40, 42, 34, 30; 204/253, 204/255, 257; 29/623.2; 156/151; 277/628
See application file for complete search history.

(56) References Cited

U.S. PATENT DOCUMENTS 5,336,570 A * 8/1994 Dodge, Jr. .................. 429/31
5,464,700 A * 11/1995 Steck et al. .................. 429/30
5,509,942 A * 4/1996 Dodge ........................ 29/623.2
6,231,053 B1 * 5/2001 Wakamatsu .................. 277/628
6,699,613 B1 * 3/2004 Inoue et al. .................. 429/35
6,720,103 B1 * 4/2004 Nagai .......................... 429/36
6,805,986 B1 * 10/2004 Kuroki ........................ 429/22

FOREIGN PATENT DOCUMENTS

| EP | 05-86461 B1 | | 3/1994 |
|---|---|---|---|
| JP | 05-283093 | * | 10/1993 |
| JP | 05-283093 A | | 10/1993 |
| JP | 08-078028 | * | 3/1996 |
| JP | 09-147891 | * | 6/1997 |
| JP | 2002-086482 | | 3/2002 |

* cited by examiner

*Primary Examiner*—Michael Barr
*Assistant Examiner*—Robert Hodge
(74) *Attorney, Agent, or Firm*—Sughrue Mion, PLLC

(57) ABSTRACT

A method for mounting a seal in a fuel cell comprising: a membrane electrode assembly formed by holding an electrolyte membrane between a first electrode and a second electrode and having a seal mounting portion; a separator plate layered on both surfaces of the membrane electrode assembly so as to form gas passage; and a frame-shaped separator plate held between the membrane electrode assembly and the separator plate so as to seal the gas passage in air tight. The method comprises: preforming the seal into a predetermined shape; setting the seal at the mounting portion of the membrane electrode assembly; and integrally forming the seal with the membrane electrode assembly.

12 Claims, 5 Drawing Sheets

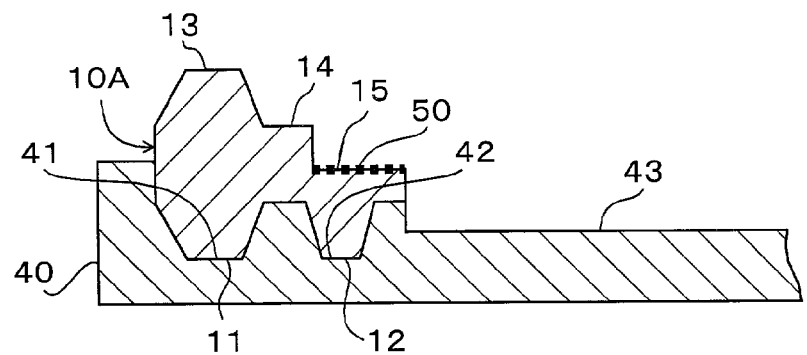
Fig. 8A
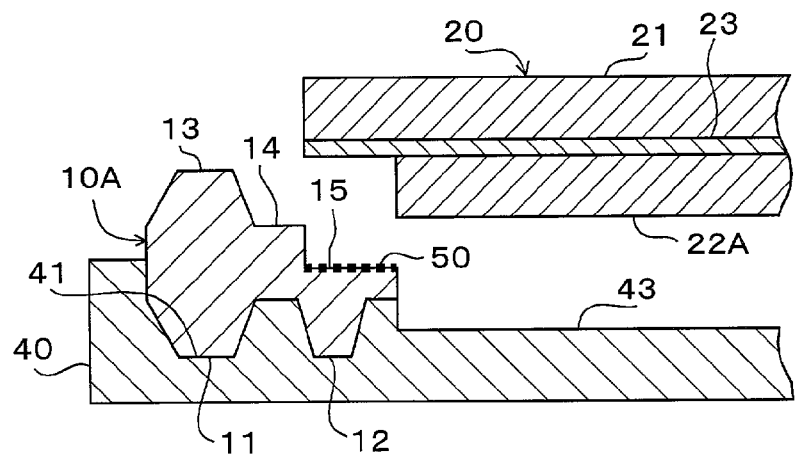
Fig. 8B
Fig. 8C
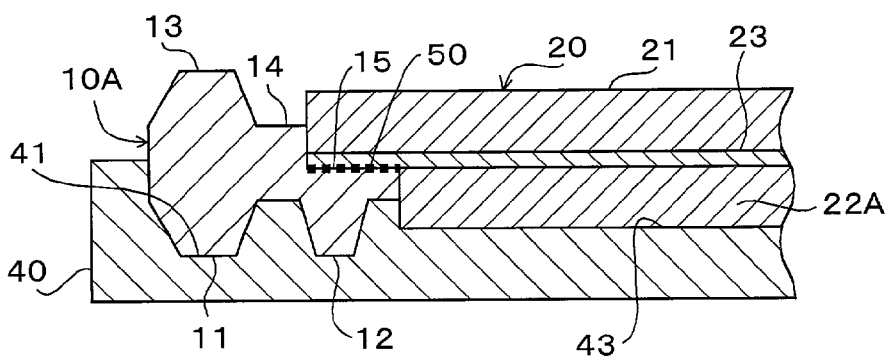
Fig. 8D
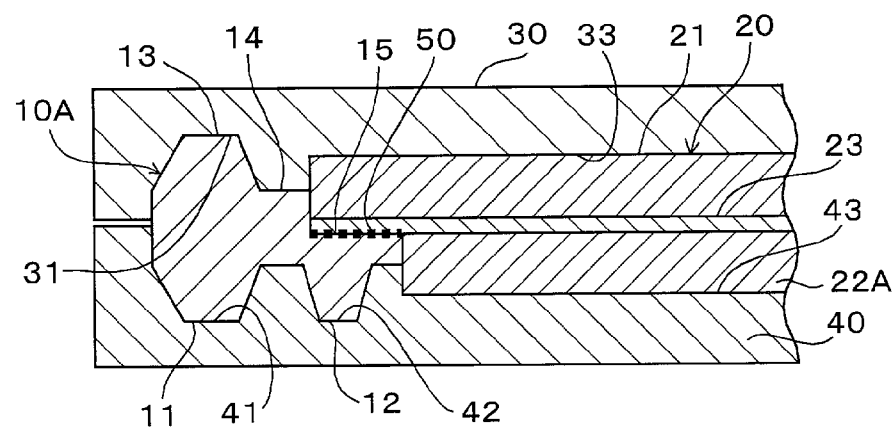
Fig. 8E

METHOD FOR MOUNTING SEALS FOR FUEL CELL AND FUEL CELL

BACKGROUND OF THE INVENTION

1. Technical Field

The present invention relates to a method for mounting seals used for gas sealing at a predetermined portion in a polymer electrolyte fuel cell, and relates to fuel cells having such seals.

2. Background Art

In polymer electrolyte fuel cells, a separator plate is layered on both sides of a plate-shaped membrane electrode assembly to form a unit of the layered structure, and the plural units are layered to form a fuel cell stack. The membrane electrode assembly is a layered structure, in which an electrolyte membrane is held by gas-diffusion electrode plates at a positive side and a negative side. The separator plate is made from a material having electron transmitting characteristics, and has plural grooved gas passages in which a fuel gas such as hydrogen gas, an oxidizing gas such as oxygen or air, and a coolant flow individually. The separator plate is layered on the membrane electrode assembly such that linear protrusions between the gas passages are contacted with the gas-diffusion electrode plates.

In the fuel cell, a fuel gas is provided to the gas passage of the separator plate at the negative electrode side, and an oxidizing gas is provided to the gas passage of the separator plate at the positive electrode side, whereby electricity is generated by electrochemical reaction. During the operation of the fuel cell, the gas-diffusion electrode plates transmit the electrons generated by the electrochemical reaction between the gas-diffusion electrode plates and the separator plates, and diffuse the fuel gas and the oxidizing gas. The electrode plate at the negative electrode side produces a chemical reaction for the fuel gas so as to generate protons and electrons. The electrode plate in the positive electrode side generates water from oxygen, the protons, and the electrons, and the electrolyte membrane facilitates ionic migration for the proton, whereby the electric power is provided via the positive and negative electrode plates.

In the above-described fuel cell, the fuel gas, the oxidizing gas, and the coolant must be flowed in the individual gas passages, so that the gas passages are separated from each other by a seal. The sealing portion varies according to the structure of the fuel cell stack. For example, a seal is provided around communicating openings of the gas passages penetrating the fuel cell stack, around the membrane electrode assembly, around a coolant passage provided on the outer surface of the separator plate, and around the circumference of the outer surface of the separator plate.

According to conventional sealing technology, in general, an elastic material made from an organic rubber of the fluorine type, silicone type, ethylene propylene type, or the like, is formed into a shape of a sheet or an O-ring, and is mounted to a sealing portion. The sealing member seals the sealing portion by a reaction force generated by being compressed in a stacked condition. As other sealing structures, a seal in which an inorganic material formed of carbon or ceramics is compressed, a mechanical seal using caulking, and the like have been provided.

Fuel cells are often carried or installed in automobiles for use. In these cases, the cells are stringently required to be small and thin. Since separator plates are usually made from brittle carbon, they are readily broken during assembly of a fuel cell stack. Therefore, seals made from organic rubbers are widely used, since they are flexible and have suitable reaction force, thereby preventing breakage of the separator plate in the assembly of a fuel cell stack.

In order to mount such a seal between an electrolyte membrane of a membrane electrode assembly and a separator plate, heretofore, the membrane electrode assembly was installed in a die, a vulcanized rubber as a material for the seal was charged into a cavity formed in the die, and the material for the seal was hardened to be integrally formed with the electrolyte membrane.

Electrolyte membranes are easily deformed and wrinkled due to humidity, so that sealing properties cannot be ensured, and problems in which sufficient clamping thickness for the seal cannot be obtained occur due to variation of the thickness of the membrane electrode assembly. The mounting method in which seals are integrally formed with the membrane electrode assembly has been mentioned to be effective for overcoming such problems. However, in such a method, the vulcanization for the seal material is generally performed at a high temperature and at a high pressure, so that an excess amount of heat load is exerted on the electrolyte membrane and the electrode plate. As a result, the electrolyte membrane and the electrode plate are deteriorated, and they are contaminated and damaged during the handing thereof in the vulcanization in some cases.

SUMMARY OF THE INVENTION

Therefore, an object of the present invention is to provide a method for suitably mounting seals in a membrane electrode assembly without adverse effects thereto, and to provide a fuel cell having such a seal.

The present invention provides a method for mounting a seal in a fuel cell comprising: a membrane electrode assembly formed by holding an electrolyte membrane between a first electrode and a second electrode and having a seal mounting portion; a separator plate layered on both surfaces of the membrane electrode assembly so as to form gas passage; and a frame-shaped separator plate held between the membrane electrode assembly and the separator plate so as to seal the gas passage in air tight; the method comprising: preforming the seal into a predetermined shape; setting the seal at the mounting portion of the membrane electrode assembly; and integrally forming the seal with the membrane electrode assembly.

According to the invention, since the seal has been preformed, and is integrally formed with the membrane electrode assembly, excess heat load is not exerted on the membrane electrode assembly in comparison with the conventional method in which a seal is adhered to a membrane electrode assembly by vulcanization. Therefore, problems such as deterioration, contamination, and damage to electrode plates and the electrolyte membrane can be avoided, and the seal can be normally mounted on the membrane electrode assembly. Since the seal is mounted on the membrane electrode assembly, operation for handling separated seals can be omitted when the membrane electrode assemblies and seals are alternately layered to form a fuel cell stack, and the seal does not easily become twisted and misaligned, whereby the sealing properties can be improved.

The present invention further provides a method for mounting a seal in a fuel cell comprising: a membrane electrode assembly formed by holding an electrolyte membrane between a first electrode and a second electrode; a separator plate layered on both surfaces of the membrane electrode assembly so as to form gas passage; and a frame-shaped separator plate held between the membrane electrode assembly and the separator plate so as to seal the gas passage in air tight; the method comprising: using a hot pressing die having a first die and a second die; setting the first electrode in the first die; preforming the seal into a predetermined shape and coating an adhesive on a portion thereof with which the electrolyte membrane is contacted; setting the seal at a circumference of the first electrode in the first die; layering the electrolyte membrane on the adhesive coated on the seal and the first electrode; layering the second electrode on the electrolyte membrane; and close-contacting the first and second electrodes, the electrolyte membrane, and the seal by holding them with the first and second dies, and integrally forming them by hot pressing. This invention includes embodiments in which a reinforcement member is inserted into the seal in a condition in which a portion thereof is exposed, and an adhesive is coated on the exposed portion of the reinforcement member, and in which a reinforcement member is inserted into the seal, and an adhesive is coated on the seal.

The present invention further provides a method for mounting a seal in a fuel cell comprising: a membrane electrode assembly formed by holding an electrolyte membrane between a first electrode and a second electrode; a separator plate layered on both surfaces of the membrane electrode assembly so as to form gas passage; and a frame-shaped separator plate held between the membrane electrode assembly and the separator plate so as to seal the gas passage in air tight; the method comprising: using a hot pressing die having a first die and a second die; setting the first electrode in the first die; preforming the seal into a predetermined shape in a condition in which a reinforcement member is inserted into the seal and an inner portion of the reinforcement member projects inwardly; layering the seal at a circumference of the first electrode in the first die in a condition in which the inner projected portion of the reinforcement member overlaps with a portion of the first electrode; layering the electrolyte membrane on the first electrode in a condition in which the inner projected portion of the reinforcement member is held between the first electrode and the electrolyte membrane; layering the second electrode on the electrolyte membrane; and close-contacting the first and second electrodes, the electrolyte membrane, the seal, and the reinforcement member by holding them with the first and second dies, and integrally forming them by hot pressing.

The present invention further provides a method for mounting a seal in a fuel cell comprising: a membrane electrode assembly formed by holding an electrolyte membrane between a first electrode and a second electrode; a separator plate layered on both surfaces of the membrane electrode assembly so as to form gas passage; and a frame-shaped separator plate held between the membrane electrode assembly and the separator plate so as to seal the gas passage in air tight; the method comprising: using a hot pressing die having a first die and a second die; setting the first electrode in the first die; preforming the seal into a predetermined shape in which a inner portion thereof projects inwardly; layering the seal at a circumference of the first electrode in the first die in a condition in which the inner projected portion of the seal overlaps with a portion of the first electrode; layering the electrolyte membrane on the first electrode in a condition in which the inner projected portion of the seal is held between the first electrode and the electrolyte membrane; layering the second electrode on the electrolyte membrane; and close-contacting the first and second electrodes, the electrolyte membrane, and the seal by holding them with the first and second dies, and integrally forming them by hot pressing.

In the above three specific features, the seal can be mounted on the electrolyte membrane of the membrane electrode assembly at the same time as the membrane electrode assembly consisting of the electrode plates and the electrolyte membrane is formed.

The present invention further provides a method for mounting a seal in a fuel cell comprising: a membrane electrode assembly formed by holding an electrolyte membrane between a first electrode and a second electrode; a separator plate layered on both surfaces of the membrane electrode assembly so as to form gas passage; and a frame-shaped separator plate held between the membrane electrode assembly and the separator plate so as to seal the gas passage in air tight; the method comprising: using a hot pressing die having a first die and a second die; preforming the seal into a predetermined shape and coating an adhesive on a portion thereof with which the electrolyte membrane is contacted; setting the seal in the first die; preforming the membrane electrode assembly so as to expose a portion of the electrolyte membrane toward a surface of the membrane electrode assembly; setting the membrane electrode assembly in the first die in a condition in which the exposed portion of the electrolyte membrane overlaps with the adhesive coated on the seal; close-contacting seal and the membrane electrode assembly by holding them with the first and second dies, and integrally forming them by hot pressing.

In the invention, the seal may be formed from materials of the elastomer type which require heating for vulcanizing or hardening, or materials of the thermoplastic elastomer type which do not require heating. As other materials for the seal, liquid materials of the cold setting type or the thermo-setting type may be mentioned. The reinforcement member may be a sheet formed from a resin or a metal, or a wire made from a resin or a metal.

The present invention also provides a fuel cell formed by layering plural membrane electrode assemblies via a separator plate respectively, wherein the membrane electrode assembly is mounted with a seal by the above method for mounting a seal in a fuel cell.

BRIEF EXPLANATION OF THE DRAWINGS

FIGS. 8A to 8E are vertical cross sections showing sequential steps in a method for mounting seals according to a eighth embodiment of the invention.

DETAILED DESCRIPTION OF THE INVENTION

Figure 1A:
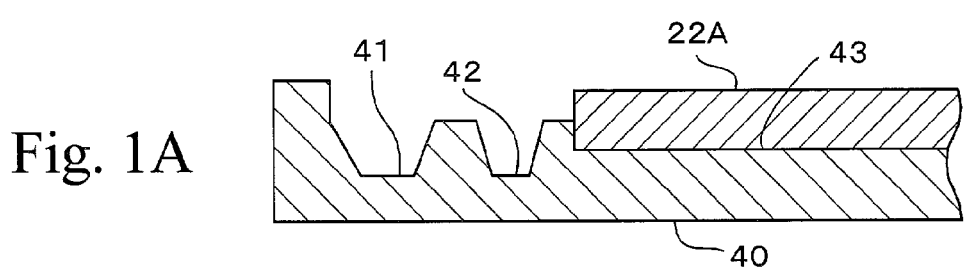
FIGS. 1A to 1E are vertical cross sections showing sequential steps in a method for mounting seals according to a first embodiment of the invention.

Embodiments of the invention will be explained hereinafter with reference to the figures.

(1) First Embodiment

FIGS. 1A to 1E are vertical cross sections showing sequential steps in a method for mounting seals according to a first embodiment. Reference numeral 10A is a seal which is preformed, and 20 is membrane electrode assembly. The seal 10A is formed into a rectangular frame in plane view, and is applied to be held between circumferences of a layered structure consisting of the membrane electrode assembly 20 and a separator plate (not shown) so as to air tight seal gas passages formed between the membrane electrode assembly 20 and the separator plate. The lower surface of the seal 10A is formed in duplicate with an outer linear protrusion 11 having a trapezoidal cross section and an inner linear protrusion 12 having a smaller width than the outer linear protrusion 11. The inner linear protrusion 12 can be omitted when the separator plate has a linear protrusion at a position corresponding to the inner linear protrusion 12. The upper surface of the seal 10A is formed with a linear protrusion 13 symmetrically with the outer linear protrusion 11 at the lower side with respect to the vertical direction. The inner portion of the linear protrusion 13 on the upper surface of the seal 10A is formed with a step portion 14 having a rectangular cross section. The inner portion of the step portion 14 is formed with a plane close-contacting surface 15 for close-contacting with a electrolyte membrane 23 forming the membrane electrode assembly 20. The seal 10A is formed from materials of the elastomer type which require heating for vulcanizing or hardening, materials of the thermoplastic elastomer type which do not require heating, and liquid materials of the cold setting type or the thermosetting type.

Numeral 30 and 40 in FIG. 1 are rectangular upper and lower dies for forming a hot pressing die. As shown in FIG. 1A, the circumference of the upper surface of the lower die 4 is formed in duplicate with an outer groove 41 and an inner groove having a trapezoidal cross section. These grooves 41 and 42 are rectangular along the circumference of the lower die 40, into which the outer linear protrusion 11 and the inner linear protrusion 12 on the lower side of the seal 10A are fitted.

Figure 1B:
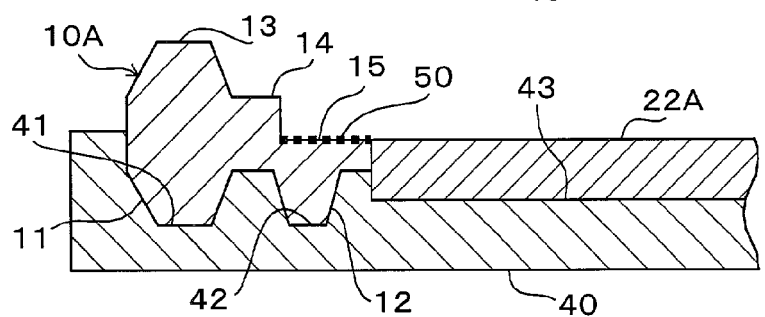
Figure 1C:
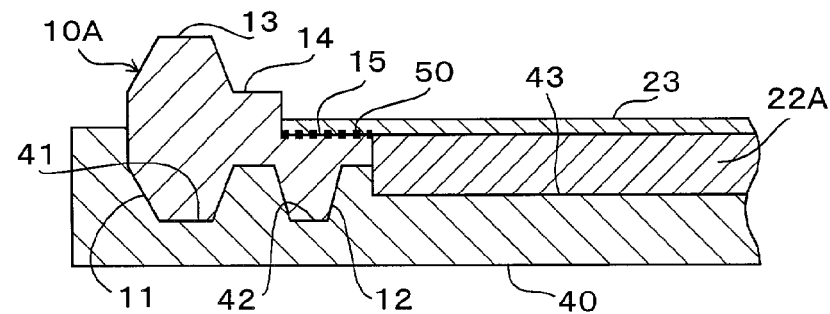
Figure 1D:
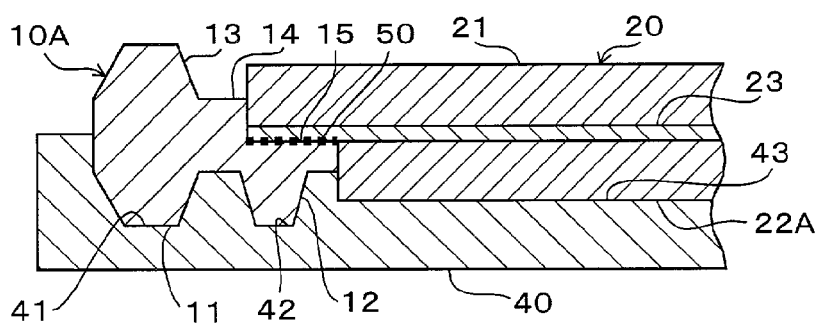
Figure 1E:
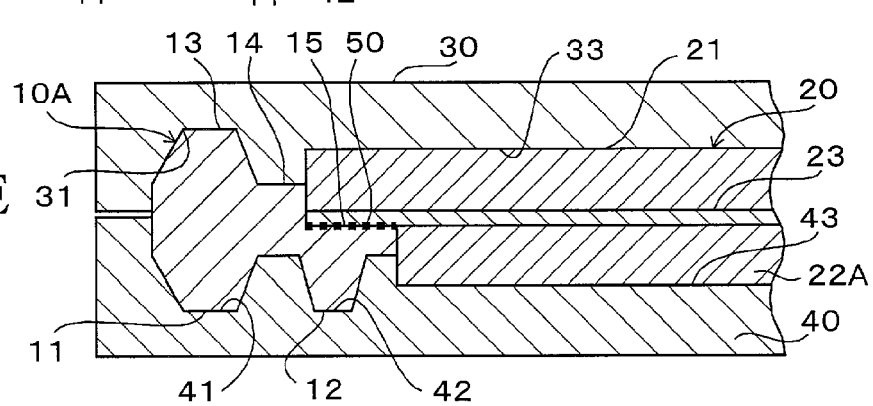

As shown in FIG. 1E, the circumference of the lower surface of the upper die 30 is formed with a groove 31 similarly with that of the outer groove 41 of the lower die 40. The groove 31 corresponds to the outer groove 41 of the lower die 40, into which the outer linear protrusion 13 of the seal 10A is fitted. The center portions of the upper and lower dies 30 and 40 are formed with rectangular recesses 33 and 43, into which a positive electrode plate 21 and a negative electrode plate 22A, which form the membrane electrode assembly 20, are fitted respectively. In this case, the area of the recess 43 of the lower die 40 is larger than that of the recess 33 of the upper die 30, so that the overall circumference of the recess 33 of the upper die 30 projects outward from the recess 43 of the lower die 40 when the upper and lower dies 30 and 40 are brought together.

As shown in FIG. 1D, the membrane electrode assembly 20 is a three-layered structure in which the electrolyte membrane 23 is held by a pair of the gas-diffusion electrode plates (positive electrode plate 21 and negative electrode plate 22A). The electrolyte membrane 23 is made from, for example, fluorine-type membranes with a sulfonic acid group at a side-chain thereof (for example, Flemion (trade name) produced by Asahi Glass Co., Ltd., and Nafion (trade name) produced by DuPont). In this case, the area of the negative electrode plate 22A is smaller than that of the positive electrode plate 21, and the electrolyte membrane 23 has the same area as the positive electrode plate 21. When these are layered with each other, the overall circumferences of the lower surfaces of the positive electrode plate 21 and electrolyte membrane 23 project outward from the negative electrode plate 22A, and the circumference of the lower surface of the electrolyte membrane 23 is exposed.

Next, the procedure for mounting the seal 10A to the membrane electrode assembly 20 will be explained with reference to FIGS. 1A to 1E.

As shown in FIG. 1A, the negative electrode plate 22A is fitted into the recess 43 of the lower die of the hot pressing die. In this condition, approximately half the height of the negative electrode plate 22A projects from the recess 43. Then, as shown in FIG. 1B, an adhesive is coated on the close-contacting surface 15 of the seal 10A, and the seal 10A is set to the lower die 40 by fitting the linear protrusions 11 and 12 on the lower surface side into the grooves 41 and 42. In this condition, the close-contacting surface 15 coincides with the upper surface of the negative electrode plate 22A. Then, as shown in FIG. 1C, the electrolyte membrane 23 is layered on the negative electrode plate 22A and the close-contacting surface 15 of the seal 10A. The electrolyte membrane 23 has a size so as to be contained within the inside of the step portion 14 of the seal 10A without clearance. Then, as shown in FIG. 1D, the positive electrode plate 21 is layered on the electrolyte membrane 23.

As shown in FIG. 1E, the upper and lower dies 30 and 40 are brought together in fitting the linear protrusion 13 and the positive electrode plate 21 into the groove 31 and the recess 33 respectively. The seal 10A and the membrane electrode assembly 20 are clamped by the dies 30 and 40, and hot pressing is performed. The conditions for the hot pressing are, for example, a temperature of 150 to 160° C. a time of 1 to 2 minutes, and a pressure of 1 to 2 MPa. By the hot pressing, the electrolyte membrane 23 is close-contacted with the positive electrode plate 21 and the negative electrode plate 22A, so that the membrane electrode assembly 20 is assembled, and the seal 10A is integrally adhered to the electrolyte membrane 23, that is, the membrane electrode assembly, via the adhesive 50.

According to the above embodiment, since the seal 10A has been preformed, the seal is integrally formed with the membrane electrode assembly 20, excess heat load is not exerted on the membrane electrode assembly 20 in comparison with the conventional method in which a seal is adhered to a membrane electrode assembly by vulcanization. Therefore, problems such as deterioration, contamination, and damage to the positive electrode plate 21, the negative electrode plate 22A, and the electrolyte membrane 23 can be avoided, and the seal 10A can be normally mounted on the membrane electrode assembly 20. Since the seal 10A is mounted on the membrane electrode assembly 20, operation for handling separated seals can be omitted when the membrane electrode assemblies 20 and seals are alternately layered to form a fuel cell stack, and the seal 10A does not easily become twisted and misaligned, whereby the sealing properties can be improved. Furthermore, since the assembly of the membrane electrode assembly 20 and the mounting the seal 10A to the membrane electrode assembly 20 can be performed at the same time as the hot pressing, the process can be simplified.

Next, second through eighth embodiments of the invention will be explained hereinafter. In the explanations of these embodiments, numerals corresponding to those in the first embodiment are attached to the elements corresponding to those in the first embodiment, and explanations for these elements will be omitted. The hot pressing die is not shown in the figures except for FIG. 8.

(2) Second Embodiment

Figure 2A:
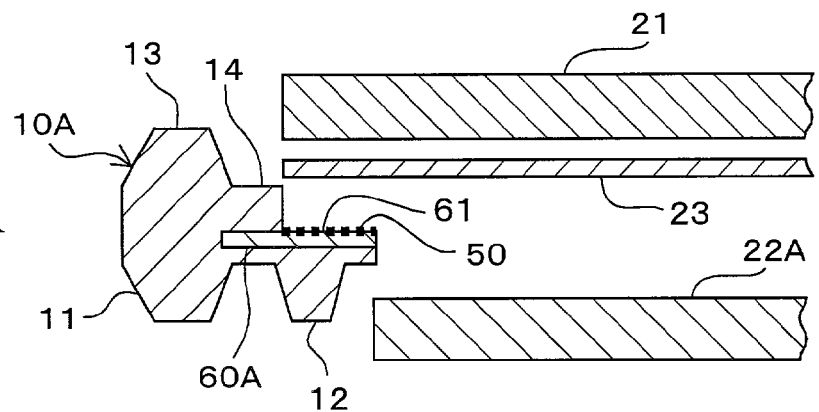
FIGS. 2A and 2B are vertical cross sections showing sequential steps in a method for mounting seals according to a second embodiment of the invention.
Figure 2B:
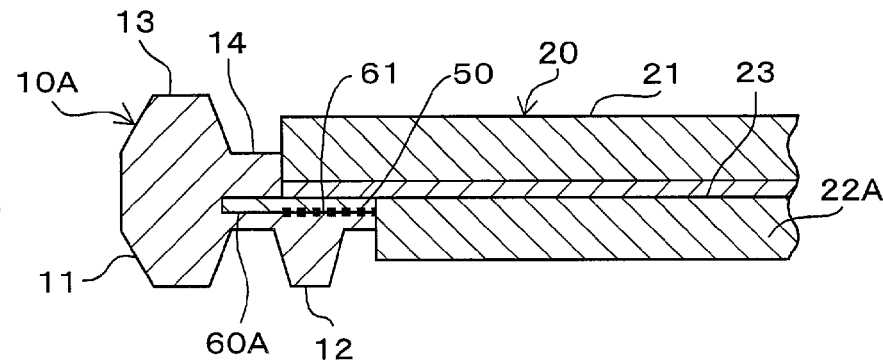

FIGS. 2A and 2B show a mounting method for seals according to a second embodiment. In the second embodiment, a frame-shaped reinforcement member 60A is inserted in the inner circumference of the seal 10A. The reinforcement member 60A is a thin-plate sheet made from a resin or a metal, the outer circumference thereof is inserted in the lower portion of the step portion 14 of the seal 10A, and the upper surface of the inner circumference thereof is exposed so as to form close-contacting surface 61 similar to the close-contacting surface 15. The inner end surfaces of the reinforcement member 60A and the seal 10A coincide with each other.

The procedure for mounting seals in the second embodiment is the same as in the first embodiment. As shown in FIG. 2A, an adhesive 50 is coated on the close-contacting surface 61 of the reinforcement member 60A. As shown in FIG. 2B, in hot pressing, the close-contacting surface 61 is adhered to the electrolyte membrane 23 via the adhesive 50, and the seal 10A is integrally mounted on the membrane electrode assembly 20.

(3) Third Embodiment

Figure 3A:
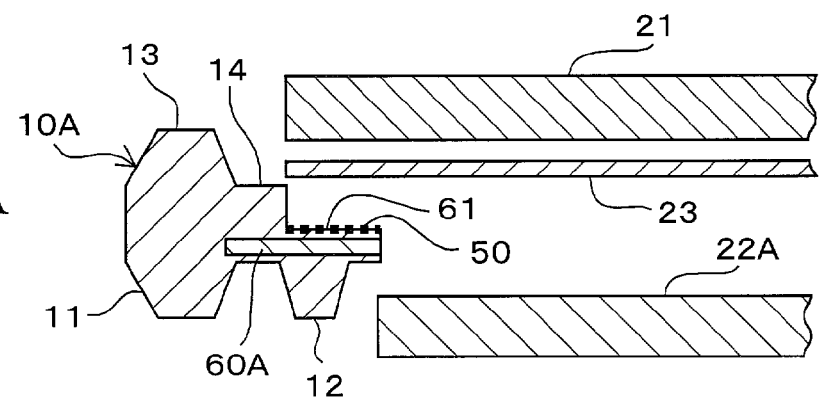
FIGS. 3A and 3B are vertical cross sections showing sequential steps in a method for mounting seals according to a third embodiment of the invention.
Figure 3B:
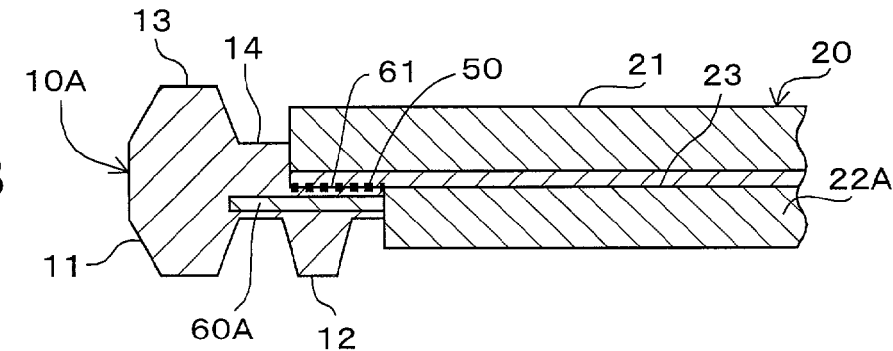

FIGS. 3A and 3B show a mounting method for seals according to a third embodiment. In the third embodiment, the entire portion of the reinforcement member 60A except for the inner end surface is inserted in the inner circumference of the seal 10A. The reinforcement member 60A is located at a position lower than that of the second embodiment, and only the inner end surface is exposed at the inner end surface of the seal 10A. It should be noted that the inner end surface of the reinforcement member 60A need not be exposed. The close-contacting surface 15 is designed similarly to that in the first embodiment.

The procedure for mounting seals in the third embodiment is the same as that in the first embodiment. An adhesive 50 is coated on the close-contacting surface 15 of the seal 10A, and as shown in FIG. 3B, in hot pressing, the close-contacting surface 15 is adhered to the electrolyte membrane 23 via the adhesive 50, and the seal 10A is integrally mounted to the membrane electrode assembly 20.

(4) Fourth Embodiment

Figure 4A:
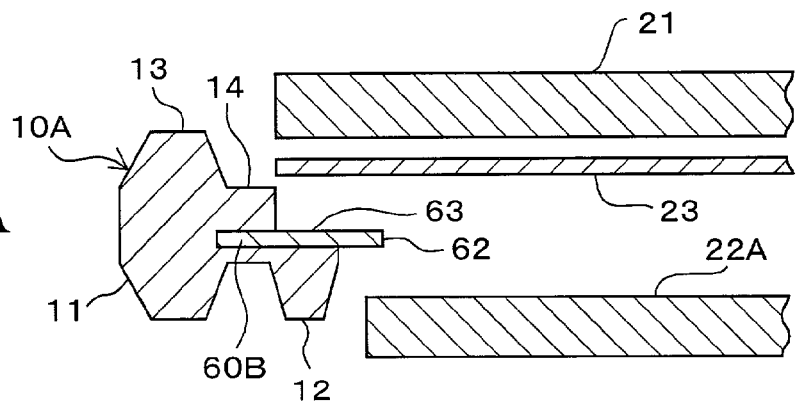
FIGS. 4A and 4B are vertical cross sections showing sequential steps in a method for mounting seals according to a fourth embodiment of the invention.
Figure 4B:
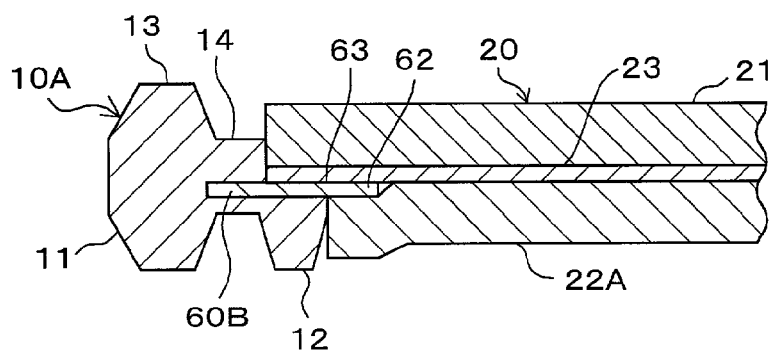

FIGS. 4A and 4B show a mounting method for seals according to a fourth embodiment. As shown in FIG. 4A, in the fourth embodiment, a reinforcement member 60B is inserted in the inner circumference of the seal 10A. The inner end portion of the reinforcement member 60B projects inwardly from the seal 10A. The reinforcement member 60B is inserted in the seal 10A in the same manner as the reinforcement member 60A in the second embodiment. That is, the reinforcement member 60B has a width wider than that of the reinforcement member 60A in the second and third embodiments, and the wider portion projects inwardly as a projected portion 62.

The procedure for mounting seals in the fourth embodiment is generally the same as that in the first embodiment.

However, an adhesive 50 is not coated on the close-contacting surface 63 of the reinforcement member 60B, and the seal 10A is set in the lower die of the hot pressing die. As result, the projected portion 62 of the reinforcement member 60B overlaps with the circumference of the negative electrode plate 22A. Then, the electrolyte membrane 23 is layered on the negative electrode plate 22A, so that the projection 23 of the reinforcement member 60B is held between the negative electrode plate 22A and the electrolyte membrane 23. Then, the positive electrode plate 21 is layered on the electrolyte membrane 23, and hot pressing is performed, whereby the seal 10A is integrally mounted to the membrane electrode assembly 20 as shown in FIG. 4B. In this procedure, the seal 10A is mounted to the membrane electrode assembly 20 by compression bonding or fusion bonding of the projected portion 62 of the reinforcement member 60B to the negative electrode plate 22 and the electrolyte membrane 23. The negative electrode 22A overlaps with the projected portion 62 of the reinforcement member 60B, and the overlapped portion thereof is slightly bent according to the thickness of the reinforcement member 60B.

(5) Fifth Embodiment

Figure 5A:
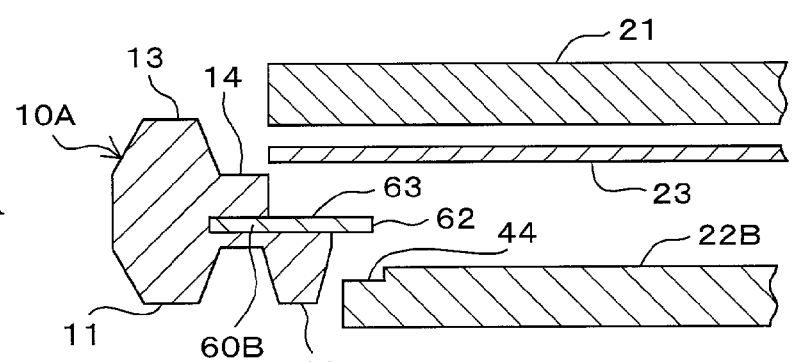
FIGS. 5A and 5B are vertical cross sections showing sequential steps in a method for mounting seals according to a fifth embodiment of the invention.
Figure 5B:
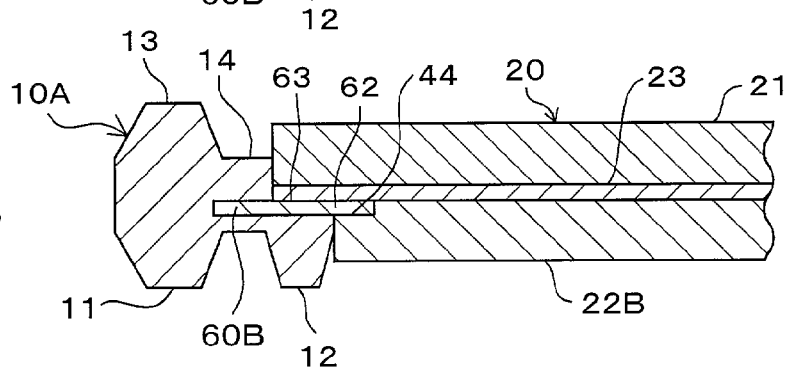

FIGS. 5A and 5B show a mounting method for seals according to a fifth embodiment, which is a rearrangement of the fourth embodiment. As shown in FIG. 5A, a negative electrode plate 22B, in which a step portion 44 is formed at the overlapping portion with the projected portion 62 of the reinforcement member 60B to avoid bending of the projected portion 62, is used. That is, the step portion 44 is formed at the outer circumference of the upper surface of the negative electrode plate 22B, and the depth thereof is the same as the thickness of the reinforcement member 60B. In the fifth embodiment, when the seal 10A is set in the lower die 40 of the hot pressing die, the projected portion 62 of the reinforcement member 60B is fitted into the step portion 44 of the negative electrode plate 22B. FIG. 5B shows the condition in which the seal 10A is integrally mounted to the membrane electrode assembly 20 by hot pressing. The negative electrode plate 22B has a planar lower surface which is not influenced by the projected portion 62 of the reinforcement member 60B.

(6) Sixth Embodiment

Figure 6A:
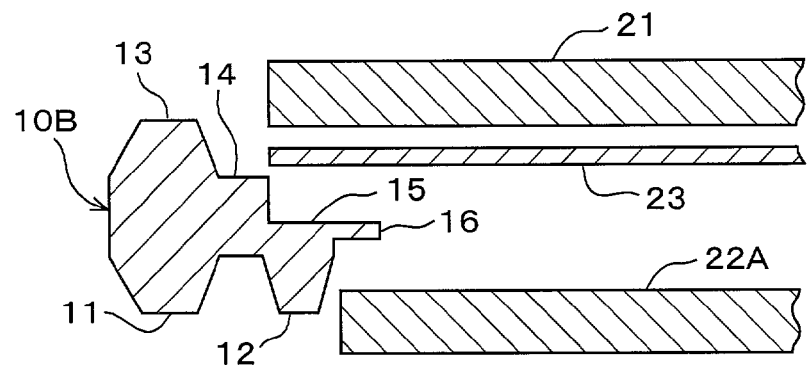
FIGS. 6A and 6B are vertical cross sections showing sequential steps in a method for mounting seals according to a sixth embodiment of the invention.
Figure 6B:
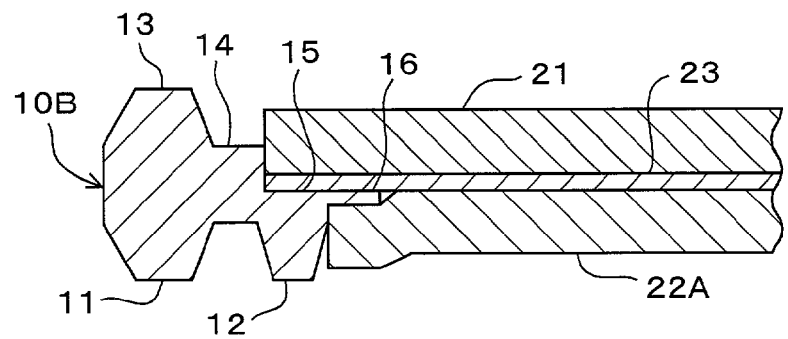

FIGS. 6A and 6B show a mounting method for seals according to a sixth embodiment, in which a seal 10B is used instead of the seal 10A. The seal 10B has a projected portion 16 at the inner surface thereof, which projects in the same manner as the projected portion 62 of the reinforcement members 60B in the fourth and fifth embodiments. The thickness of the projected portion 16 is the same as that of the reinforcement member 60B. In hot pressing, as shown in FIG. 6B, the projected portion 16 of the seal 10B is held and mounted between the negative electrode plate 22A and the electrolyte membrane 23 instead of the projected portion 62 of the reinforcement member 60B. The negative electrode plate 22A overlaps with the projected portion 16 of the seal 10B, so that the overlapping portion thereof is slightly bent according to the thickness of the projected portion 16.

(7) Seventh Embodiment

Figure 7A:
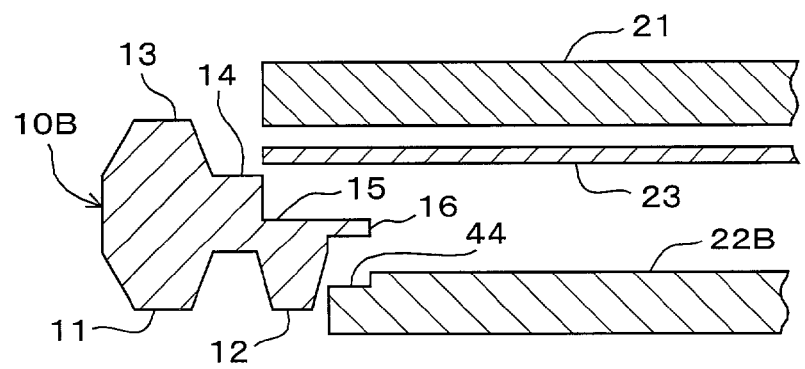
FIGS. 7A and 7B are vertical cross sections showing sequential steps in a method for mounting seals according to a seventh embodiment of the invention.
Figure 7B:
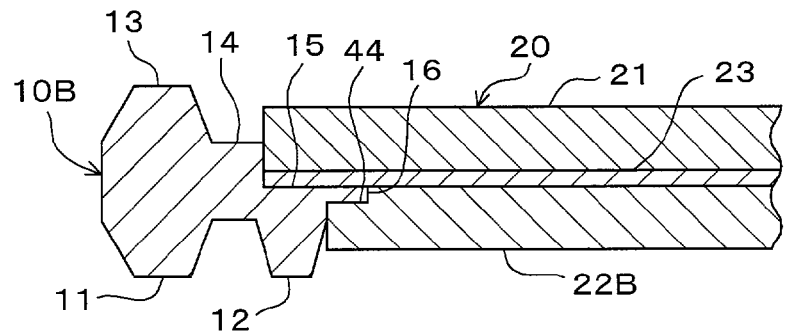

FIGS. 7A and 7B show a mounting method for seals according to a seventh embodiment, which is a combination of the fifth and sixth embodiments. The seventh embodiment includes the negative electrode plate 22B formed with the step portion 44 in the fifth embodiment and the seal 10B formed with the projected portion 16. When the seal 10B is set in the lower die 40 of the hot pressing die, the projected portion 16 of the seal 10B is fitted into the step portion 44 of the negative electrode plate 22B, and these are mounted each other. As shown in FIG. 7B, the negative electrode plate 22B has a planar lower surface which is not influenced by the projected portion 16 of the seal 10B.

(8) Eighth Embodiment

FIGS. 8A to 8D show a mounting method for seals according to an eighth embodiment. In the eighth embodiment, the seal 10A in the first embodiment is used, and the membrane electrode assembly 20 consisting of the positive electrode plate 21, the negative electrode plate 22A, and electrolyte membrane 23 is integrally formed and prepared beforehand.

In order to mount the seal 10A, first, as shown in FIG. 8A, the seal 10A in which the adhesive 50 is coated on the close-contacting surface 15 is set in the lower die 40 of the hot pressing die. Then, as shown in FIG. 8B, the negative electrode plate 22A of the negative electrode plate 22A is faced downward, and as shown in FIG. 8C, the negative electrode plate 22A is fitted into the recess 43 of the lower die 40, and the exposed lower surface of the electrolyte membrane 23 is overlapped with the close-contacting surface 15 of the seal 10A, on which the adhesive is coated, whereby the membrane electrode assembly 20 is set in the lower die 40. Then, similarly to the first embodiment, as shown in FIG. 8D, the upper die 30 is coincided with the lower die 40, and the seal 10A and the membrane electrode assembly 20 are held between the upper and lower dies 30 and 40, and hot pressing is performed so as to integrally mount the seal 10A with the membrane electrode assembly 20.

According to the second through eighth embodiments, the same effects and advantages as in the first embodiment can be obtained. That is, adverse effects due to excess heat load exerted on the membrane electrode assembly 20 can be avoided, labor for mounting separated seals can be omitted when a fuel cell stack is assembled, and the seal does not easily become twisted and misaligned, whereby the sealing properties can be improved. Specifically in the fourth through seventh embodiments, the projected portion 62 of the reinforcement member 60B inserted into the seal 10A is held between the negative electrode plate 22A (or negative electrode plate 22B) and the electrolyte membrane 23, or alternatively, the projected portion 16 of the seal 10B is held between the negative electrode plate 22A (or negative electrode plate 22B) and the electrolyte membrane 23, and the seal 10A (10B) is mounted by compression bonding or fusion bonding. Therefore, adhesive is not needed and securing strength can be improved.

The membrane electrode assembly mounted with the seal by the method for mounting seals according to the first through eighth embodiments can form a fuel cell stack by integrally layering it via a separator plate.

What is claimed is:

1. A method for mounting a seal in a fuel cell, the method comprising:

forming a membrane electrode assembly by holding an electrolyte membrane between a first electrode and a second electrode; and preforming the seal into a frame;

inserting the membrane electrode assembly into the frame;

wherein the seal contacts an exposed planar surface of the membrane and the seal abuts a side or end portion of each electrode and abuts a side or end portion of the membrane at an exposed lateral surface of the membrane and at an exposed lateral surface of each electrode; and the seal and the membrane electrode assembly are integrally bonded, wherein the second electrode has larger planar area than that of the first electrode, and has a lateral portion extending to the seal which abuts a lateral portion of the seal.

2. A method for mounting a seal in a fuel cell, the method comprising:

forming a membrane electrode assembly by holding an electrolyte membrane between a first electrode and a second electrode; and preforming the seal into a frame;

wherein a hot pressing die having a first die and a second die is used;

the first electrode is set in the first die;

wherein an adhesive is applied to the seal at an exposed planar portion of the seal corresponding to an exposed planar surface of the electrolyte membrane and the seal abuts a side or end portion of each electrode and abuts a side or end portion of the membrane at an exposed lateral surface of the membrane and at an exposed lateral surface of each electrode;

the electrolyte membrane is layered on the adhesive coated on the seal and layered on the first electrode;

the second electrode is layered on the electrolyte membrane; and the first and second electrodes, the electrolyte membrane and the seal are brought into intimate contact by holding them with the first and second dies, and they are integrally bonded by hot pressing.

3. A method for mounting a seal in a fuel cell, the method comprising:

forming a membrane electrode assembly by holding an electrolyte membrane between a first electrode and a second electrode; and wherein a hot pressing die having a first die and a second die is used;

the first electrode is set in the first die;

the seal is preformed into a frame in a condition in which a reinforcement member is inserted into the seal and the reinforcement member laterally abuts a lateral surface of one of the electrodes and abuts an exposed planar surface of the electrolyte membrane or the reinforcement member abuts an exposed planar surface of the electrolyte membrane and extends into the first electrode adjacent the exposed planar surface of the electrolyte membrane;

the electrolyte membrane is layered on the first electrode such that the reinforcement member is held between an exposed planar surface of the first electrode and an exposed planar surface of the electrolyte membrane;

the second electrode is layered on the electrolyte membrane; and the first and second electrodes, the electrolyte membrane, the seal and the reinforcement member are brought into intimate contact by holding them with the first and second dies, and they are integrally bonded by hot pressing, wherein the second electrode has larger planar area than that of the first electrode, and has a lateral portion extending to the seal which abuts a lateral portion of the seal.

4. A method for mounting a seal in a fuel cell, the method comprising:
forming a membrane electrode assembly by holding an electrolyte membrane between a first electrode and a second electrode; and
wherein a hot pressing die having a first die and a second die is used;
the first electrode is set in the first die;
the seal if preformed into a frame;
wherein the seal is layered on a portion of the first electrode in the first die in a condition in which part of an exposed planar portion of the seal overlaps with an exposed planar portion of the first electrode and an exposed lateral surface of the seal abuts an exposed lateral surface of the first electrode;
the electrolyte membrane is layered on the first electrode in a condition in which a second exposed planar portion of the seal is held between the exposed planar portion of the first electrode and an exposed planar portion of the electrolyte membrane;
the second electrode is layered on the electrolyte membrane; and
lateral surfaces of the first and seconds electrodes and a lateral surface of the electrolyte membrane abut the lateral exposed planar portion of the seal; and
the first and second electrodes, the electrolyte membrane and the seal are brought into intimate contact by holding them with the first and second dies, and they are integrally bonded by hot pressing, wherein the second electrode has larger planar area than that of the first electrode, and has a lateral portion extending to the seal which abuts a lateral portion of the seal.

5. A method for mounting a seal in a fuel cell, the method comprising:
forming a membrane electrode assembly by holding an electrolyte membrane between a first electrode and a second electrode such that there is an exposed lateral surface of each of the first electrode, the electrolyte membrane and the second electrode, the electrolyte membrane also having an exposed planar surface; and
preforming the seal into a frame;
wherein a hot pressing die having a first die and a second die is used; and
wherein an adhesive is applied to an exposed planar portion of the seal corresponding to an exposed planar surface of the electrolyte membrane and the seal will abut a side or end portion of each electrode and a side or end portion of the electrolyte membrane at an exposed lateral surface of the membrane and at an exposed lateral surface of each electrode;
setting the seal in the first die;
setting the membrane electrode assembly in the first die in a condition in which the exposed planar portion of the electrolyte membrane contacts the adhesive coating on the seal and further wherein the exposed lateral surface of each of the first electrode, the second electrode and the electrolyte membrane contact an exposed lateral portion of the seal; and
the seal and the membrane electrode assembly are brought into intimate contact by holding them with the first and second dies, and the seal and the membrane electrode assembly are integrally bonded by hot pressing.

6. A method for mounting a seal in a fuel cell according to claim 2, wherein a reinforcement member is inserted into the seal in a condition in which a planar portion thereof is exposed, and an adhesive is coated on the exposed planar portion of the reinforcement member.

7. A method for mounting a seal in a fuel cell according to claim 2, wherein a reinforcement member is inserted into the seal, and an adhesive is coated on an exposed planar portion of the seal.

8. A method for mounting a seal in a fuel cell according to claim 1,
wherein the seal is formed from materials of the elastomer type which require heating for vulcanizing or hardening, or materials of the thermoplastic elastomer type which do not require heating.

9. A method for mounting a seal in a fuel cell according to claim 1,
wherein the seal is formed from liquid materials of the cold setting type or the thermosetting type.

10. A method for mounting a seal in a fuel cell according to claim 3,
wherein the reinforcement member is a sheet formed from a resin or a metal, or a wire made from a resin or a metal.

11. A fuel cell formed by layering plural membrane electrode assemblies via a separator plate respectively, wherein the membrane electrode assembly is mounted with a seal by a method for mounting a seal in a fuel cell according to one of claims 1 to 10.

12. A method for mounting a seal in a fuel cell according to one of claims 1 to 10, wherein the seal includes an outer linear protrusion and an inner linear protrusion disposed inside thereof;
the outer linear protrusion contacts adjacent upper and lower seals of adjacent upper and lower fuel cell units when fuel cell units are assembled to a fuel cell stack;
the inner linear protrusion is provided at an upper side or a lower side of the seal; and
the inner linear protrusion contacts the second electrode of the adjacent fuel cell unit.

* * * * *